United States Patent [19]

Sauer

[11] 4,162,883
[45] Jul. 31, 1979

[54] APPARATUS FOR THERMOFORMING HOLLOW ARTICLE HAVING A HIGH L/D RATIO

[75] Inventor: Donald G. Sauer, Harwinton, Conn.

[73] Assignee: National Can Corporation, Chicago, Ill.

[21] Appl. No.: 842,254

[22] Filed: Oct. 14, 1977

Related U.S. Application Data

[63] Continuation-in-part of Ser. No. 717,636, Aug. 25, 1976, Pat. No. 4,130,387, Ser. No. 583,427, Jun. 3, 1975, Pat. No. 4,085,177, Ser. No. 506,333, Sep. 16, 1974, abandoned, Ser. No. 469,404, May 13, 1974, abandoned, and Ser. No. 448,191, Mar. 5, 1974, abandoned.

[51] Int. Cl.² .......................................... B29C 17/04
[52] U.S. Cl. ................................. 425/387.1; 425/388
[58] Field of Search ............ 425/416, 388, 398, 387.1, 425/400

[56] References Cited

U.S. PATENT DOCUMENTS

| 3,027,596 | 4/1962 | Knowles | 425/326.1 X |
|---|---|---|---|
| 3,105,270 | 10/1963 | Fibish | 425/145 |
| 3,178,771 | 4/1965 | Fischer | 425/387.1 X |
| 3,341,895 | 9/1967 | Shelby | 425/388 X |
| 3,346,923 | 10/1967 | Brown et al. | 425/162 |
| 3,376,607 | 4/1968 | Brown | 425/416 X |
| 3,507,007 | 4/1970 | Martin | 425/388 |
| 3,801,244 | 4/1974 | Eisenberg | 425/437 X |

Primary Examiner—Robert L. Spicer, Jr.
Attorney, Agent, or Firm—Robert A. Stenzel

[57] ABSTRACT

There is disclosed a thermoforming process and apparatus or machine including a male mold assembly and a pressure box or a female mold assembly disposed on support members or platens maintained in fixed relationship to each other whereby the pressure box assembly is first caused to pass through the plane of the heated plastic material whereafter the male mold then is caused to move into the pressure box together with the simultaneous introduction of controlled amounts of a pressurized fluid until complete interrelationship is attained with relative movement of the male mold to the pressure box being continued to a point proximate the plane of heated thermoplastic material as more clearly hereinafter discussed.

7 Claims, 6 Drawing Figures

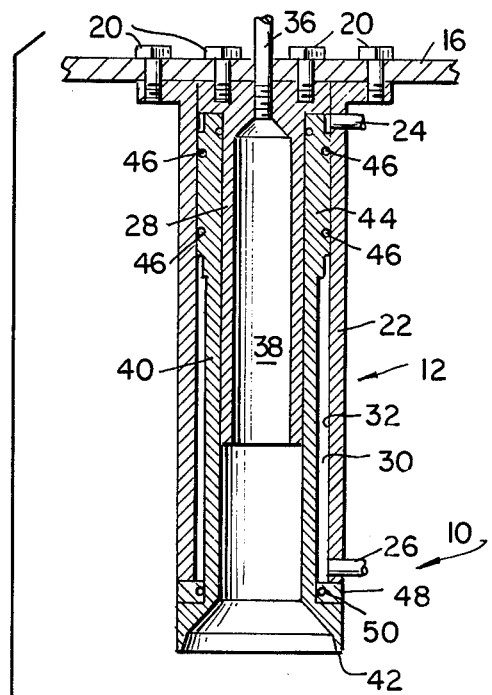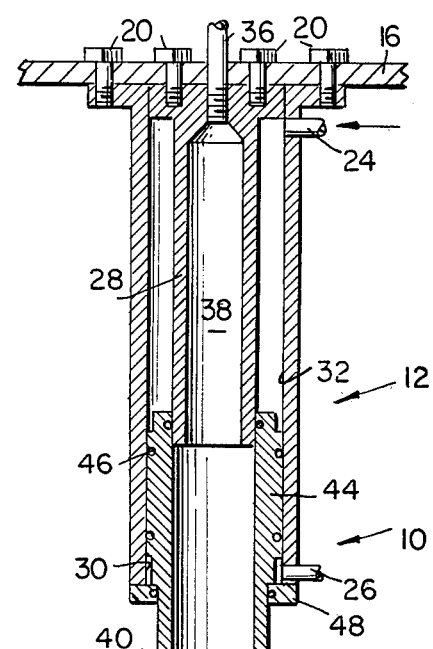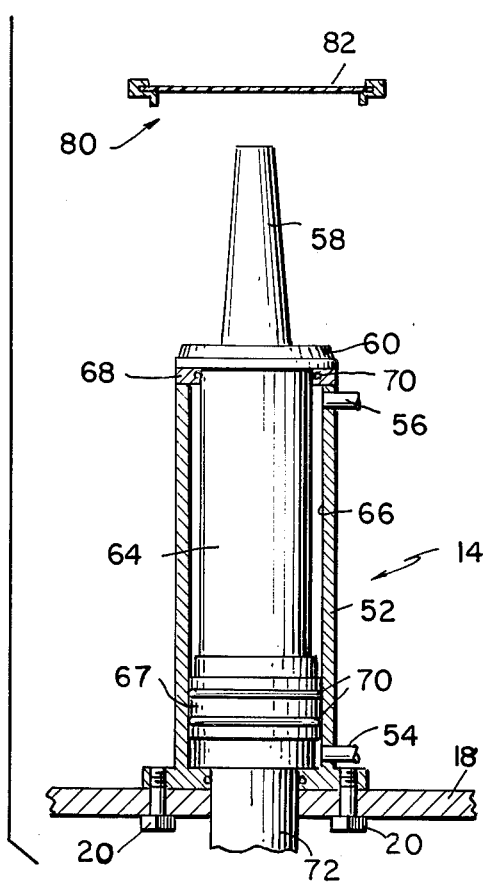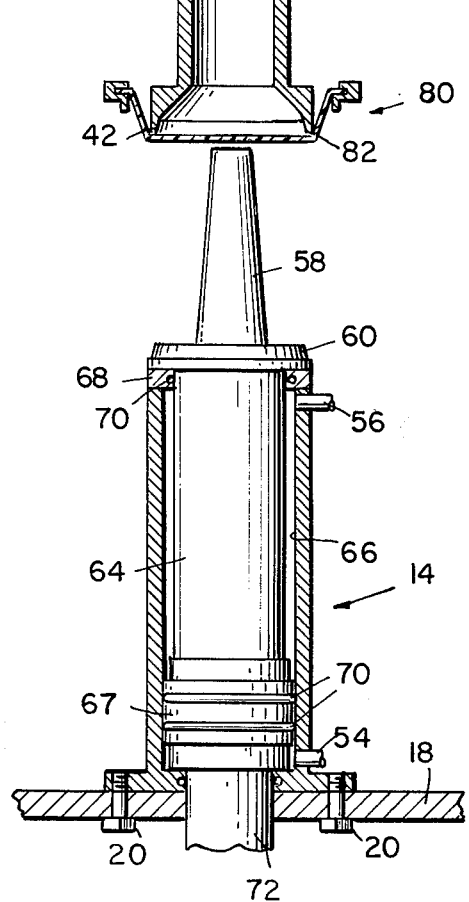
FIG.2
FIG.3

APPARATUS FOR THERMOFORMING HOLLOW ARTICLE HAVING A HIGH L/D RATIO

RELATED U.S. APPLICATIONS

Field of Invention

This invention relates to a novel process and apparatus for molding hollow plastic articles from a sheet or strip of thermoplastic material. This invention is a continuation-in-part of applications Ser. Nos. 448,191, now abandoned; 469,404, now abandoned; 583,427, now U.S. Pat. No. 4,085,177; 506,333, now abandoned and 717,636, now U.S. Pat. No. 4,130,387, filed Mar. 5, 1974; May 13, 1974; June 3, 1975; Sept. 16, 1974 and Aug. 25, 1976 respectively.

BACKGROUND OF THE INVENTION

This invention is particularly concerned with thermoforming operations in which a web or sheet of thermoplastic material is first softened by heat and then formed or shaped while in this stretchable plastic state by being drawn or pressed against the contours of a mold or die under the influence of a fluid pressure differential. The former may be exemplified by the application of pressure within a pressure box produced by compressed air or the like, to press the softened material against the contours of a male mold or core pin. Alternately, a vacuum may be applied from within a female mold while allowing atmospheric pressure to shape the heat softened thermoplastic material against the surface of such female mold. For many purposes, a combination of these two techniques is preferred with the softened sheet material being subjected to vacuum on the face contacting the mold surfaces and to a substantial positive pressure on its other face as such combination provides greater versatility and better control in the forming operation.

The apparatus for effecting thermoforming operations, in general, is comprised of a press having upper and lower platens on which are mounted a male mold assembly and female mold or pressure box assembly. In this regard, the male mold is generally mounted on the lower platen, however, this is normally a matter of choice. Prior to forming of the sheet of heated thermoplastic material as hereinabove discussed, a clamping assembly normally constituting a part of the male mold assembly is first caused to trap the sheet of thermoplastic material about the entrance into the female mold of the pressure box assembly including a cooperating clamping grid. Thereafter, the male mold assembly is caused to pass through the plane of the thermoplastic material and eventually form the hollow article, as hereinabove discussed. The relative movement of the male and female molds is effected by hydraulic cylinder assemblies and associated equipment moving the respective platens on which such assemblies are mounted whereas movement of the clamping assembly is effected by an associated cylinder assembly of a mold. Generally, tonnage clamping pressures are required necessitating high pressure operations.

Such hydraulic cylinder assemblies are large even for small thermoforming apparatus and have high energy requirements. In this application the term fluid cylinder assembly is to be interpreted as the combination of a cylinder, piston and rod which is operated by a fluid including air, gas or a liquid, such as a hydraulic fluid, whereas a gaseous cylinder assembly is a similar combination of elements motivated by a gas.

In copending application U.S. Ser. No. 717,636, assigned to the same assignee as the present invention, there is disclosed a novel process for thermoforming hollow plastic articles wherein the relative movement of the male mold and female mold are effected by fluid, preferably gas cylinder assemblies rather than hydraulic cylinder assemblies which move the male mold assembly and female mold assembly including the male mold and female molds respectively.

In all such thermoforming operations, the formed article has a tendency to become distorted or disformed prior to removal from the supporting sheet of thermoplastic material, particularly large L/D hollow articles or bottles as a result of non-support of the thus formed article between forming and removal. Present technology limits L/D ratio to less than about 7:1.

OBJECTS OF THE INVENTION

It is an object of the present invention to provide a novel thermoforming process and apparatus.

Another object of the present invention is to provide a novel process and apparatus for thermoforming a hollow article having L/D ratios of up to about 12:1.

A further object of the present invention is to provide a novel process and apparatus for thermoforming a hollow article eliminating the normally associated clamping assemblies.

Still another object of the present invention is to provide a novel process and apparatus for thermoforming a hollow article using pressure levels substantially below normal thermoforming tonnage pressure levels.

Still another object of the present invention is to provide a novel thermoforming process and apparatus having reduced energy requirements.

Various other objects and advantages of the present invention will become apparent from the following detailed description of an exemplary embodiment thereof with the novel features thereof being particularly pointed out in the appended claims.

SUMMARY OF THE INVENTION

In accordance with one embodiment of the present invention, there is disclosed a thermoforming process and apparatus or machine including a male mold assembly and a pressure box or a female mold assembly disposed on support members or platens which are maintained in fixed relationship to each other during thermoforming operation. The pressure box assembly is first caused to pass through the plane of the heated plastic material. The male mold then is caused to further move into the pressure box of the pressure box assembly with the simultaneous introduction of controlled amounts of a pressurized fluid into the pressure box. Movement of the male mold into the pressure box is continued until complete interrelationship is attained with relative movement of the male mold to the pressure box being continued to a point proximate the plane of heated thermoplastic material as more clearly hereinafter discussed. The pressure box and male mold are caused to return to their respective starting positions with subsequent indexing of the thermoplastic sheet.

BRIEF DESCRIPTION OF THE DRAWINGS

The invention will be more clearly understood by reference to the following detailed description of an exemplary embodiment thereof in conjunction with the accompanying drawings with like reference numerals designated like parts in all figures in which:

FIGS. 2 to 5 are sectional side views of the pressure box and male mold assemblies of the thermoforming machine omitting some accessories for greater clarity and sequentially illlustrating the formation of a hollow article.

DETAILED DESCRIPTION OF THE INVENTION

It will be appreciated that the type of thermoplastic or thermoelastically deformable material employed in the present process is generally determined by the economics and duty in which the hollow article will eventually be placed. Among the many thermoplastic resins suitable for various purposes and adaptable to thermoforming are high-impact polystyrene, polybutadiene, styrene-butadiene blends or copolymers, polyvinylchloride and related vinyl polymers, nylon, formaldehyde polymers, polyethylene, polypropylene, nitrocellulose, cellulose acetate, cellulose propionate, cellulose acetate, acetate butyrate, polymethylmethacrylate, ethyl cellulose, benzyl cellulose and ethyl-esters of cellulose.

Figure 1:
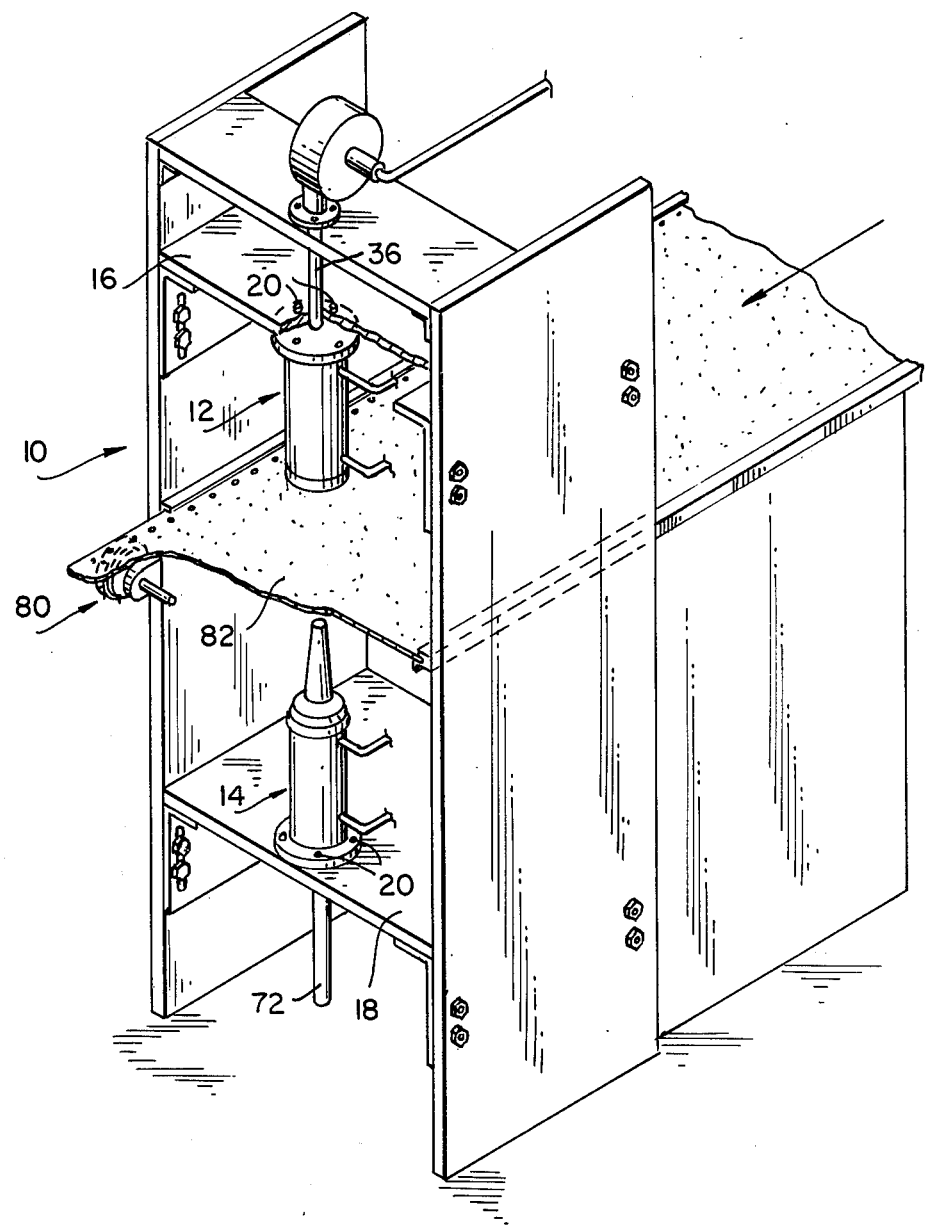
FIG. 1 is an isometric view of a thermoforming apparatus embodying the principles of the present invention.
Figure 4:
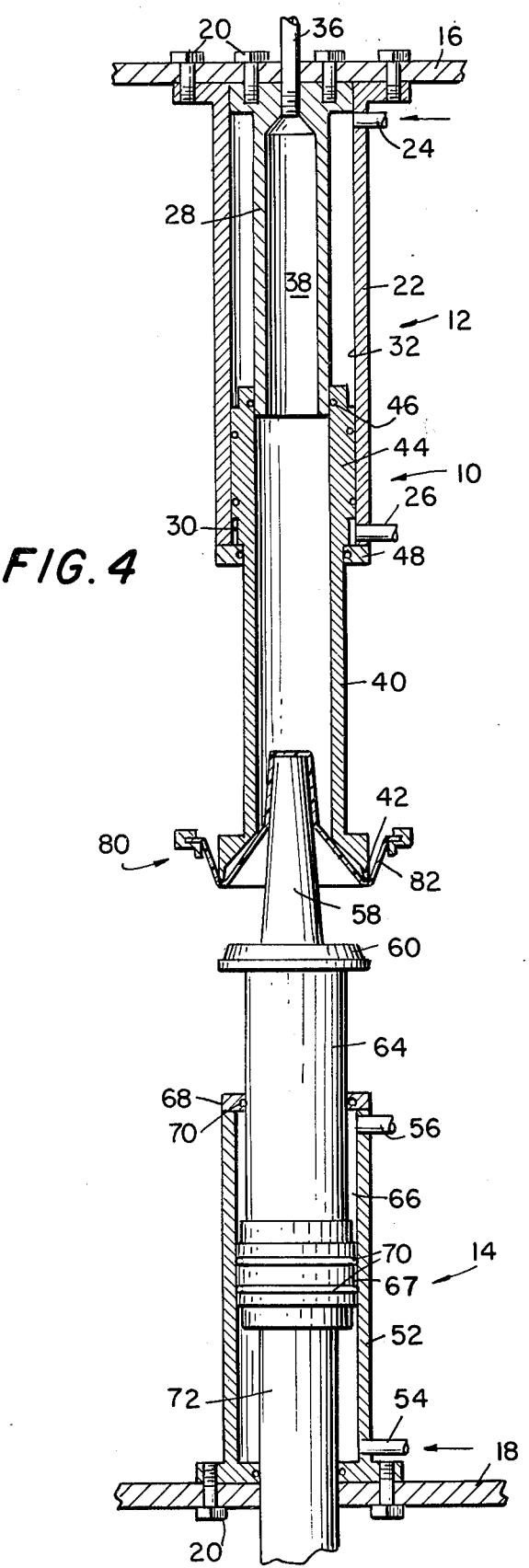
Figure 5:
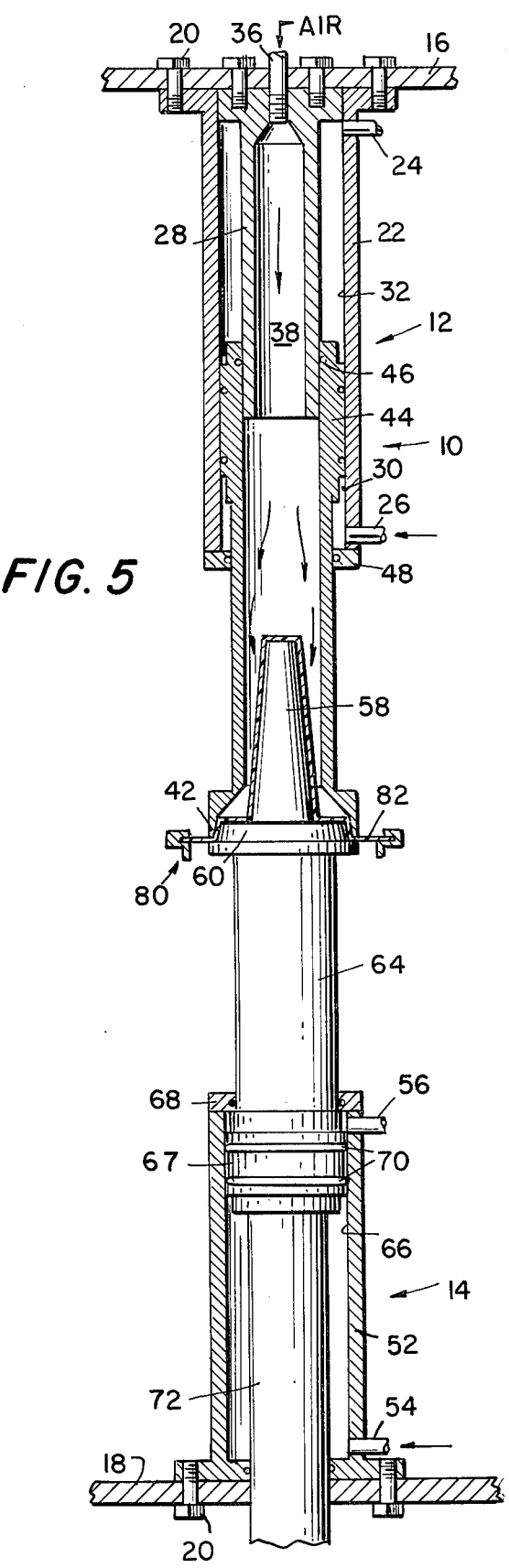

Referring now to FIG. 1, there is illustrated a thermoforming molding machine, generally indicated as 10, comprised of a pressure box assembly, generally indicated as 12, and a male mold assembly, generally indicated as 14, mounted on upper and lower support platform 16 and 18, respectively, such as by bolts 20. The platforms 16 and 18 are adjustable in a vertical direction with regard to the thermoforming machine 10 to permit proper positioning thereof with reference to the product being molded and the die components of the mold assembly, as described in the aforementioned U.S. application Ser. No. 717,636. It will be understood that any such thermoforming assembly would be associated with the usual control panels for providing adequate control of cycle time, temperature, etc., as well as condition monitoring. It will also be understood that a plurality of mold assemblies may be disposed on each support platform. In the interest of clarity, all items are to be assumed to be cylindrical or conically shaped, it being understood that any shape may be used with due regard for the product being produced.

The pressure box assembly 12, referring to FIG. 2, is formed of an outer cylindrically-shaped member 22 rigidly mounted to the support platform 16 and is provided with upper and lower passageways 24 and 26, respectively, to provide for the flow of a fluid medium therein. Vertically mounted to the support platform 16 concentrically within the outer cylindrically-shaped member 22 is an inner cylindrically-shaped member 28 forming a cylindrical compartment 30 by inner and outer walls 32 and 34 of the outer and inner members 22 and 28, respectively. The inner cylindrically-shaped member 28 is provided with a conduit 36 to provide for the introduction and withdrawal of a fluid into a chamber 38 of the pressure box assembly 12 by placing such an orifice in fluid communication with the compression side of a pump (not shown), such as described and shown in copending application U.S. Ser. No. 583,427 filed June 8, 1975 and assigned to the same assignee as the present invention. Slidably disposed between the inner and outer cylindrically-shaped members 28 and 22, respectively, is an extendible cylindrically-shaped member 40 having a leading edge portion 42 and an enlarged piston portion 44 including gaskets 46. A ring member 48 including a gasket 50 is mounted at the lower portion of the outer member 22 to provide for the fluid integrity of compartment 30.

The male mold assembly 14 is comprised of a cylindrically-shaped member 52 rigidly mounted to the lower support platform 18, such as by bolts 20, and is provided with lower and upper passageways 54 and 56. The male mold assembly 14 includes a conically-shaped male mold 58 mounted on a disc member 60 mounted on a piston assembly, generally indicated as 62, including a cylindrically-shaped mold support member 64. The piston assembly 62 forms a compartment 66 with the cylindrically-shaped outer member 52. A ring member 68 including a gasket 70 is mounted on the upper portion of the outer member 52 to provide for the fluid integrity of chambers 66.

The male mold 58 may be formed in part of porous material (i.e., having a multiplicity of discrete passageways formed during fabrication thereof), such as two (2) micron stainless steel such as disclosed in copending application U.S. Ser. No. 448,191, filed Feb. 4, 1974, and assigned to the same assignee as the present invention. The male mold is generally formed of a material exhibiting excellent heat transfer properties, such as copper and with a conduit system to provide fluid communication between the porous metal portions as more fully hereinafter described.

The piston assembly 62 is generally formed of one piece construction and includes the cylindrically-shaped male mold support member 64 an intermediate enlarged cylindrically-shaped portion 66 including gaskets 70 and a lower cylindrically-shaped support rod 72. In FIG. 1 there is also illustrated a feed mechanism, generally indicated as 80, for advancing the thermoplastic web or sheet 82, after being heated to a softened state by suitable means (not shown), such as radiant heaters, infrared lamps, etc.

The following description in conjunction with FIGS. 2 to 6 illustrates the sequence of steps in the formation of a hollow article in accordance with the present invention. As is known to those skilled in the art, the pressure box assembly 12, at the beginning of a cycle, is mounted on a platen positioned above the thermoplastic sheet a distance sufficient to permit the subsequent unimpeded horizontal passage of the formed article upon advancement of the thermoplastic sheet, however, in accordance with the present invention, the pressure box assembly 12 is fixedly positioned to the support platform 16 relative to the sheet of thermoplastic material as is the male mold assembly 14 fixedly positioned on the lower support platform 18.

The strip of thermoplastic sheet 82 softened to an optimum forming temperature (i.e. to a stretchable plastic condition) is advanced by the feed mechanism 80 into position between the upper and lower assemblies 12 and 14. The extendible cylindrical-shaped member 40 of the pressure box assembly 12 is caused to be moved vertically downwardly by the introduction of a fluid under pressure through upper passageway 24 into the chamber 30 until the leading edge portion 42 of the member 40 contacts the sheet of thermoplastic material (see FIG. 3).

The male mold 58 is then caused to be moved vertically upward by the introduction of a fluid under pressure through the lower passageway 54 into the chamber 66 forcing the piston assembly 62 to move upwardly (FIG. 4) to a point where the male mold 56 is fully positioned within the chamber 38 of the pressure box assembly 12, thereby forming hollow article 90 about the male mold 58 and contoured to the surface thereof. During upward movement of the male mold 58, a controlled amount of fluid medium is introduced through conduit 36 into the interior portion of the chamber 38 to assist in forming the hollow article about the contoured surface of the male mold 58. Upward movement of the male mold 58 is continued against a lesser positive pressure in the chamber 30 until the piston assembly 62 is fully extended within the male mold assembly 14, a point proximate to the plane of the sheet of thermoplastic material 82. Alternately, the chamber 30 is placed in fluid flow communication with passageway 24 by a valve (not shown) for controlled bleeding of the fluid medium to permit full extension of the piston assembly 62 of the male mold assembly 14.

Thereafter, the extendible member 40 is caused to be moved vertically upwards and the male mold 56 caused to be moved vertically downwardly to initial positions by the introduction of a pressurized fluid medium through passageways 26 and 54 whereby the formed hollow article 90 may readily be advanced during subsequent advancement of the thermoplastic sheet 82 by the drive means 80. The interior portion of the male mold member 58 may be placed on the compression side of a pump (not shown) to facilitate removal of the hollow article 90 from the contoured surface of the male mold member 58.

The feed mechanism 80 is thereafter actuated to move a section of web 82 having the shaped article 90 projecting thereabove out of the machine 10, and to position a fresh section of heated plastic sheet between the assemblies 12 and 14 in preparation for the next molding cycle. Hollow articles formed in accordance with the present invention may be conveyed to a liner feeder apparatus, such as disclosed in copending application U.S. Ser. No. 492,783 filed July 29, 1974, assigned to the same assignee as the present invention.

Figure 6:
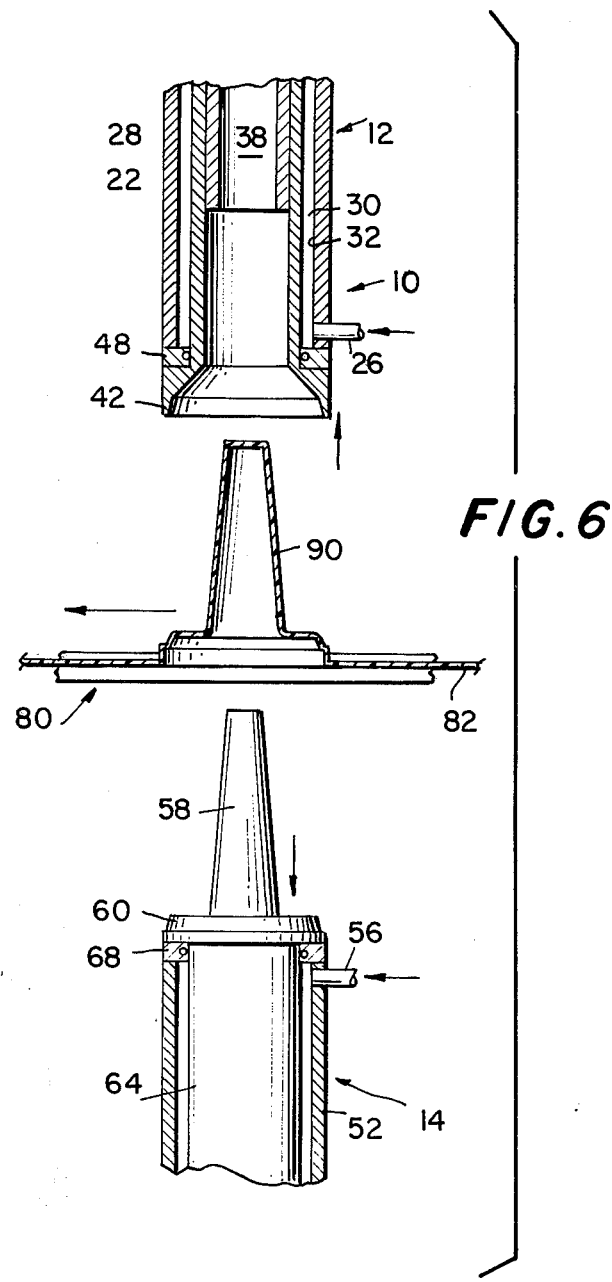
FIG. 6 is a rotated sectional side view of the thermoforming machine of the present invention.

As hereinabove mentioned, hollow articles may be formed having L/D ratios of up to at least about 12:1. A hollow cylindrically-shaped article, such as illustrated in FIG. 6 after trimming, had an L/D ratio of 12.6/1 for an opening of ¼ inch in diameter. Additionally, in accordance with applicant's invention, pressures in the range of from 30 to 50 psig, are used which substantially increases tool life as well as minimize deflection during forming. While the preferred fluid for effecting movement of the assemblies of the present invention in a pressurized gas, such as air, it will be apparent that a liquid hydraulic fluid may be used, however, complicating tool design.

While the present invention has been described with reference to the use of a pressure box assembly, it will be readily appreciated by one skilled in the art, that the pressure box assembly may be replaced with a female die assembly having appropriate orifices for drawing, inter alia, a vacuum, with the male mold provided with suitable passageways whereby a hollow article may be formed shaped to the contoured surface of the female die.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. An apparatus for thermoforming a hollow article from a sheet of thermoplastic material which comprises:
   an upper and lower support platforms fixedly mounted in spaced relationship to said apparatus;
   a male mold assembly including a male member means for assisting in the formation of said hollow article, said male mold assembly being mounted on one of said support platform;
   a female mold assembly including a female member means having a leading edge portion and formed with a chamber, said female mold assembly being mounted on said other support platform, said male mold means and said female member means being positioned relative to each other at a distance greater than the length of said hollow article to be formed;
   means for supply and passing said sheet of thermoplastic material between said male mold assembly and said female mold assembly;
   fluid cylinder means associated with said female mold assembly for extending said female member means to cause said leading edge of said female member means to contact a selected portion of said sheet of thermoplastic material and thereafter to cause said leading edge of said female member means to pass through the plane of said sheet of thermoplastic material;
   fluid cylinder means associated with said male mold assembly for extending said male member means through said selected portion of said sheet of thermoplastic means defined by said leading edge of said female member means and into said chamber of said female member means, each said fluid cylinder means including means for returning said female member means and said male member means to an initial position; and
   means for removing said thus formed hollow article from said apparatus.

2. The apparatus as defined in claim 1 wherein said fluid cylinder means are motivated by a compressed gaseous media.

3. The apparatus as defined in claim 1 wherein said support platforms are adjustably mounted to said assembly.

4. The apparatus as defined in claim 1 wherein said male member means is formed with an outer surface contoured to the shape of said hollow article.

5. The apparatus as defined in claim 4 wherein said female member means includes conduit means for introducing a compressed gaseous media into said chamber of said female member means to assist in forming said thermoplastic material about said outer surface of said male member means.

6. The apparatus as defined in claim 1 wherein said chamber of said female member means is formed with a surface contoured to the shape of a portion of said hollow article.

7. The apparatus as defined in claim 6 wherein said male mold assembly includes conduit means in fluid communication with the compression side of a compressor means to assist in forming said thermoplastic material within said inner surface of said chamber of said female member means.

* * * * *